United States Patent
Gravino

(10) Patent No.: US 10,976,784 B2
(45) Date of Patent: Apr. 13, 2021

(54) MOBILE DEVICE USER INTERFACE CHANGE BASED ON MOTION

(75) Inventor: Douglas David Gravino, Roswell, GA (US)

(73) Assignee: COX COMMUNICATIONS, INC., Atlanta, GA (US)

(*) Notice: Subject to any disclaimer, the term of this patent is extended or adjusted under 35 U.S.C. 154(b) by 786 days.

(21) Appl. No.: 12/828,858

(22) Filed: Jul. 1, 2010

(65) Prior Publication Data

US 2012/0001843 A1 Jan. 5, 2012

(51) Int. Cl.

| G06F 1/16 | (2006.01) |
|---|---|
| G06F 9/451 | (2018.01) |
| H04M 1/72454 | (2021.01) |
| G06F 3/0484 | (2013.01) |
| G06F 3/0488 | (2013.01) |

(52) U.S. Cl.
CPC ............ G06F 1/1694 (2013.01); G06F 9/451 (2018.02); H04M 1/72454 (2021.01); *G06F 3/0488* (2013.01); *G06F 3/04842* (2013.01); *G06F 2200/1637* (2013.01); *H04M 2250/12* (2013.01)

(58) Field of Classification Search
CPC ...... H04Q 7/20; H04M 3/42; H04M 1/72569; H04M 2250/12; H04M 2250/10; B60N 2/002; H04W 4/027; H04W 52/0254; G06F 3/04842; G06F 19/3406; G06F 2200/1637; G06F 3/0346; G06F 3/0488
USPC ........... 345/173; 455/412.2, 418, 557, 456.4, 455/556.1; 340/670
See application file for complete search history.

(56) References Cited

U.S. PATENT DOCUMENTS

| 7,444,551 | B1* | 10/2008 | Johnson | G06F 11/0745 714/41 |
|---|---|---|---|---|
| 7,898,428 | B2* | 3/2011 | Dietz | H04M 1/72577 340/669 |
| 2002/0123329 | A1* | 9/2002 | Murray | H04M 1/72569 455/414.1 |
| 2004/0127198 | A1* | 7/2004 | Roskind | H04M 1/72566 455/412.2 |
| 2004/0225519 | A1* | 11/2004 | Martin | G11B 27/002 705/53 |
| 2005/0239479 | A1* | 10/2005 | Bednasz | H04M 1/72572 455/456.1 |
| 2007/0026850 | A1* | 2/2007 | Keohane | H04M 1/6075 455/418 |
| 2007/0124045 | A1* | 5/2007 | Ayoub | G06F 21/10 701/36 |

(Continued)

OTHER PUBLICATIONS

Sam Grobart, "Driven to Distraction High-Tech Devices Help Drivers Put Down Phone", New York Times, published Nov. 21, 2009, http://nytimes.com/2009/11/22/technology/22distracted.html?_r=1 and printed Feb. 16, 2010.

*Primary Examiner* — Sanjiv D. Patel

(74) *Attorney, Agent, or Firm* — Merchant & Gould P.C.

(57) ABSTRACT

Adapting a user interface of a mobile computing device when the mobile computing device is in a motion state is provided. Upon detecting that a mobile computing device is in motion by utilization of a location or motion determining system, such as a GPS navigation and/or accelerometer system, a motion mode UI may be activated on the device, wherein a display of device functionalities may be simplified by modifying one or more displayed elements of the device user interface.

21 Claims, 3 Drawing Sheets

(56) References Cited

U.S. PATENT DOCUMENTS

| | | | |
|---|---|---|---|
| 2007/0124046 A1* | 5/2007 | Ayoub | G06F 21/10 |
| | | | 701/36 |
| 2007/0265040 A1* | 11/2007 | Matsui | H04M 1/6091 |
| | | | 455/575.9 |
| 2008/0009296 A1* | 1/2008 | Han | 455/456.4 |
| 2008/0108329 A1* | 5/2008 | Cho | H04L 12/66 |
| | | | 455/413 |
| 2010/0062788 A1* | 3/2010 | Nagorniak | H04W 48/04 |
| | | | 455/456.1 |
| 2010/0283746 A1* | 11/2010 | Vuong et al. | 345/173 |
| 2011/0053641 A1* | 3/2011 | Lee et al. | 455/556.1 |
| 2011/0151929 A1* | 6/2011 | Schmehl et al. | 455/557 |
| 2011/0254792 A1* | 10/2011 | Waters et al. | 345/173 |

\* cited by examiner

MOBILE DEVICE USER INTERFACE CHANGE BASED ON MOTION

BACKGROUND

Mobile computing devices, such as mobile phones, personal data assistants, PDAs, and the like, have become increasingly popular. Many of today's mobile devices are utilized for much more than phone calls; they also double as audio players, cameras, video players, and personal business assistants. Users oftentimes access their mobile devices in a variety of locations and while engaging in other activities. One such location and activity in which users utilize mobile devices is in their automobile while they are driving. Recently, much attention has been given to assessing potential dangers in the use of mobile devices while driving.

One potential contributing factor to the danger of utilizing a mobile device while in motion, for example, while driving, is that user interfaces of mobile devices oftentimes contain a lot of information on a small display. Viewing small print or icons on a display while driving can be difficult, and may require a driver to divert his/her eyes from the road and to his/her device for a longer period of time. Given the growing prevalence of touch screen mobile displays, pressing a specific icon or button on the touch screen may require increased dexterity and concentration.

It is with respect to these and other considerations that the present invention has been made.

SUMMARY

Consistent with embodiments of the present invention, systems and methods are disclosed for providing a simplified user interface when motion is detected.

Many new mobile devices (e.g., mobile phones) have some location determining system, such as a global positioning system (GPS) or a network-based location system built in. Those that don't may be able to connect to a server to analyze their signals and determine their location. Many of today's mobile phones may also contain an accelerometer system that can detect acceleration. According to embodiments of the present invention, by utilizing a mobile device's location determining system and/or accelerometer, a simplified user interface may be displayed when motion is detected. Similarly, the device may return to normal operation when motion is no longer detected. By changing a mobile device's user interface to a simplified interface, a driver may be able to perform a given mobile device function by quickly glancing at his/her device. The need for driver concentration on performing a mobile device function may be reduced, and thus, driver distraction may be reduced.

User interface characteristics which may be modified to provide a simplified user interface may include font typography, font size, colors, overall screen layout, screen brightness, iconography, icon sizing, on-screen visual elements, on-screen control elements, ringer settings, notification settings, manual button functionality, availability of various phone applications, availability of various phone features, availability of various settings, voice command, and control functionality, and any other aspect of phone operation.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
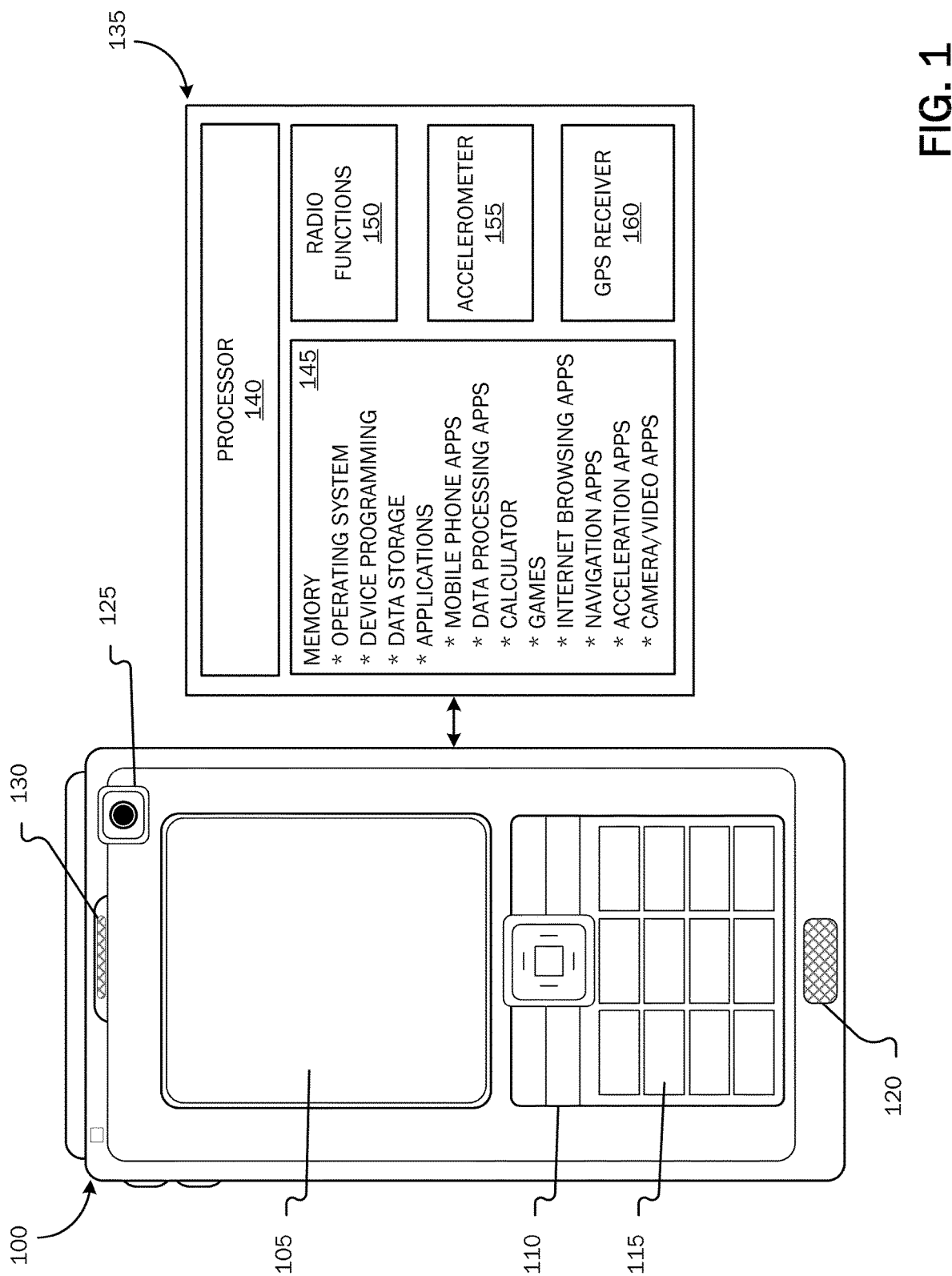
FIG. 1 is a block diagram of a mobile computing device 100 with which embodiments of the present invention may be practiced.

As briefly described above, embodiments of the present invention are directed to providing an adaptive user interface presented on a display of a mobile computing device when motion is detected. Generally described, according to embodiments, methods, systems and computer readable media provide for simplifying a user interface of a mobile computing device while the mobile computing device is in motion. A motion state of the mobile computing device is detected, and a determination is made as to whether the motion state of the mobile computing device meets a prescribed threshold. If the motion state of the mobile computing device meets the prescribed threshold, then one or more characteristics of the device user interface may be altered.

Upon detecting that a mobile computing device is in motion by utilization of a location determining system, such as a GPS, and/or an accelerometer system, a motion mode may be activated on the device, wherein functionalities may be simplified by modifying one or more functional elements of the device. For example, a touch screen phone when in motion mode may display two large visually distinct buttons. One may be labeled "Voice-Dial Phone," and the other may be labeled "Speak Text Message" in high-contrast, easy-to-read fonts. By limiting which applications may be available to a user and by making functionalities associated with those applications more simplistic, driver distraction may be reduced, safety may be improved, and passengers or users engaged in an activity in motion may be provided with an improved user interface for their situation.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1 is a block diagram of a mobile computing device with which embodiments of the present invention may be practiced. The mobile computing device 100 is illustrative of any suitable device, such as a mobile telephone, personal digital assistant (PDA), tablet computer, or handheld computer, operative to send, receive and process wireless communications according to embodiments of the present invention. A display screen 105 is operative for displaying a variety of information such as information about incoming and outgoing communications, as well as, a variety of data and displayable objects, for example, text, alphanumeric data, photographs, and the like.

Data input to the device 100 may be performed via a variety of suitable means, such as, touch screen input via the display screen 105, keyboard or keypad input via a data entry area 110, key input via one or more selectable buttons or controls 115, voice input via a microphone 120 disposed on the device 100, photographic input via a camera 125 functionality associated with the mobile computing device, or any other suitable input means. Data may be output via the device 100 via any suitable output means, including but not limited to, display on the display screen 105, audible output via an associated speaker 130 or connected earphone system, vibration module for providing tactile output, and the like.

Operational unit 135 is illustrative of internal operating functionality of the mobile computing device 100. A processor 140 is illustrative of a general purpose computer processor for processing incoming and outgoing data and communications and controlling operation of the device and associated software applications via a mobile computing device operating system. Memory 145 may be utilized for storing a device operating system, device programming, one or more stored applications, for example, mobile telephone applications, data processing applications, calculators, games, Internet browsing applications, navigation applications, acceleration applications, camera and/or video applications, etc. Mobile computing device 100 may contain an accelerometer 155 for detecting acceleration, and can be used to sense orientation, vibration, and/or shock. Mobile computing device 100 may contain a global positioning system (GPS) receiver 160, which when coupled with a navigation application, can pinpoint the device's 100 location, give directions to a provided destination, and may provide information about nearby businesses. A GPS receiver 160 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Mobile computing device 100 may utilize other location determining means, such as a client software that may compute the device's location by cell identification and signal strengths of home and neighboring cells. Mobile computing device 100 may utilize a service provider's network infrastructure to identify a location of the device. A hybrid positioning system may also be utilized for location determination, wherein the hybrid system may use a combination of network-based and device-based technologies to compute a location. A location of a mobile computing device may be determined via a reference network comprised of known location of wireless access points (i.e., wireless positioning system or WPS). Wireless access points and their locations may be used by a mobile computing device to triangulate a user's position. WPS may be combined with cellular tower triangulation and GPS to provide location data. Radio functions 150 include all required functionality, including onboard antennae, for allowing the device 100 to communicate with other communication devices and systems via a wireless network.

Although described herein in combination with mobile computing device 100, in alternative embodiments the invention may be used in combination with any number of computer systems, such as in desktop environments, laptop or notebook computer systems, tablet computers, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Figure 2:
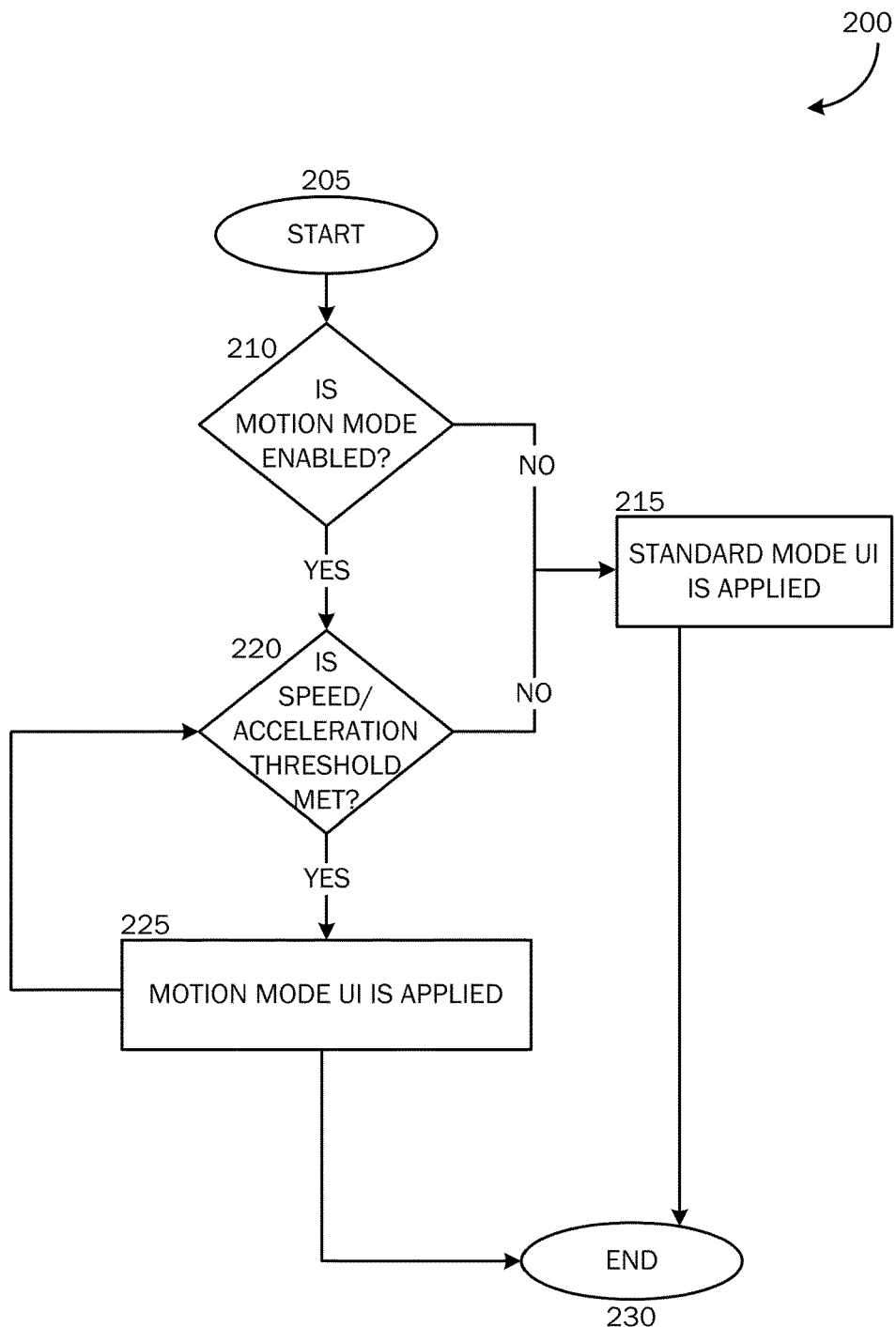
FIG. 2 is a flow diagram of a method 200 for providing a simplified mobile computing device user interface.

Having described elements of a mobile computing architecture 100 that may serve as an exemplary operating environment for embodiments of the present invention, FIG. 2 is a flow diagram of a method 200 for providing an adaptive user interface presented on a display of a mobile computing device 100 when motion is detected.

The method 200 starts at OPERATION 205 and proceeds to a DECISION OPERATION 210, where a determination may be made as to whether a motion mode feature is enabled on the device. According to embodiments, a motion mode feature may be disabled with an override feature. There may be times when it may not be desirable for a motion mode UI to be utilized. For example, if a user of a mobile computing device 100 does not operate a vehicle, a motion mode UI may not be applicable to him/her. As another example, if a user of a mobile computing device 100 is a passenger in a vehicle, a motion mode UI may not be desired. Accordingly, a setting may be provided to override a motion mode UI on a device 100. As can be appreciated, alternatively, there may be situations in which a user may want to utilize motion mode although he/she may be a passenger. For example, a user may have motion sickness when he/she looks at his/her device while traveling in an automobile, boat, airplane, or other vehicle, and may wish to have a simplified UI to help prevent motion sickness while interacting with his/her device.

According to another embodiment, there may be times when it may not be desirable to provide an override feature for motion mode UI. For example, a distributing company may have employees who drive company vehicles. The employer may wish for employees who may be driving the company vehicles to have a motion mode UI enabled on their mobile devices 100. An employer in this situation may desire for its employees to not have an override option to disable the motion mode UI on their devices.

According to another embodiment, an override feature may be provided; however a notification mechanism may also be provided to allow a third party (e.g., employer, parent, etc.) to be notified when the UI change feature has been overridden. According to embodiments, a notification may be contained in a log on the mobile computing device 100 and may be retrieved later, or may be sent as an email or SMS upon an override selection, or may be communicated in a real-time monitoring system, or may be communicated via other similar notification methods.

If at DECISION OPERATION 210 it is determined that a motion mode UI feature is not enabled on the device 100; that is, either a motion mode UI feature is not present or if it is present, if it has been disabled or overridden, the method 200 may proceed to OPERATION 215, where a standard mode UI may be applied.

If at DECISION OPERATION 210 it is determined that a motion mode UI feature is enabled on the device 100, the method 200 may proceed to DECISION OPERATION 220 where it is determined whether a mobile computing device 100 is in motion. Motion of a mobile computing device 100 may be detected by various methods. According to embodiments, a GPS receiver 160 may be utilized to detect motion of a mobile computing device 100. A GPS receiver 160 may communicate with satellites orbiting the Earth with radio waves. A GPS receiver 160 is operative to determine location of satellites and where a given mobile communication device 100 is in relation to those satellites. A GPS receiver 160 may also be operative to calculate velocity. Most receivers 160 compute speed by a combination of movement per unit time and computing the Doppler shift in the pseudo range signals from the satellites. Some GPS-enabled devices use wireless-assisted GPS to determine location. In a wireless-assisted system, a device 100 may use information about the device's signal in conjunction with orbiting GPS satellites. Many new mobile phones 100 have global positioning system (GPS) capability 160; however, devices that don't may utilize other location determining systems or motion detection systems to determine whether a motion mode should be enabled. Other location determining systems may include network-based techniques, device-based technology, or a hybrid positioning system. Network-based techniques (e.g., cell identification, triangulation, wireless positioning, such as WIFI-based positioning, etc.) may utilize a service provider's network infrastructure to identify a location of the device. Device-based technology may determine a location of a device by utilizing client software for computing its location by cell identification and signal strengths of home and neighboring cells. A hybrid positioning system may combine network-based and device-based technologies.

According to embodiments, a speed threshold may be set to determine if a device 100 is moving at a speed that is indicative that it may be traveling in a vehicle or otherwise in motion requiring motion mode. For example, a threshold of 15 miles per hour may be set for motion mode to be enabled on a device 100. A user may be running with his/her mobile device 100, and the device's GPS receiver 160 may determine the device is traveling at a speed of 6 miles per hour. Because the speed of the device 100 is lower than the set speed threshold, it may be determined that the device is in motion; however, not traveling at a speed sufficient for motion mode.

According to an embodiment, a time threshold may be provided, wherein motion mode may be activated upon a detection of motion or deactivated upon a detection of loss of motion for a specified minimum amount of time. Such an error tolerance mechanism may provide a safeguard against a false motion reading or measurement (e.g., false positive when motion is not sustained or false negative when motion diminishes). According to embodiments, other safeguard techniques may be utilized to avoid accidental or unwarranted motion mode activation.

Many of today's mobile phones 100 may also contain an accelerometer system 155. According to another embodiment of the present invention, an accelerometer 155 may be utilized to determine if a mobile device 100 may be in motion. An accelerometer 155 may be operative to measure acceleration and/or deceleration. An acceleration threshold may be set to determine if a device 100 is accelerating at a rate that is indicative that it may be traveling in a vehicle or in motion. A deceleration rate may be utilized to indicate if a device 100 is no longer in motion or traveling below a specified threshold.

If at DECISION OPERATION 220 it is determined that a mobile computing device 100 is not in motion or that it is moving at a speed less than a predetermined speed threshold, the method 200 proceeds to OPERATION 215, where a standard mode user interface (UI) may be applied. A standard mode UI may be a standard UI that contains selectable controls to a full range of a device's applications and functionalities.

If at DECISION OPERATION 220 it is determined that a mobile computing device 100 is in motion and that it is moving at a speed greater than or equal to a predetermined speed threshold, the method 200 proceeds to OPERATION 225, where the motion mode UI may be applied. According to an embodiment, if the motion state of the device 100 reaches or exceeds a threshold (e.g., a given speed) one or more characteristics of the user interface may be altered, for example, by changing a display of selectable functionalities in the user interface to enhance use of the selectable functionalities. According to embodiments, while in motion mode, certain UI characteristics may change including but not limited to, font typography, font size, colors used, overall screen layout, screen brightness, iconography, icon sizing, onscreen visual elements, onscreen control elements, ringer settings, notification settings, manual button functionalities, availability of various phone applications, availability of various phone features, availability of various settings, voice command and control functionalities, audible feedback, and any other aspect of phone operation. By changing functional elements of the UI in motion mode, phone functionality may be simplified, the display may be easier to read, and the most situational-relevant information may be conveyed. User interaction, whether via touch screen, button, or voice-based interaction, may be simplified via larger easier-to-hit on-screen icon targets, simplistic voice commands, and/or simplified button functionalities.

Figure 3B:
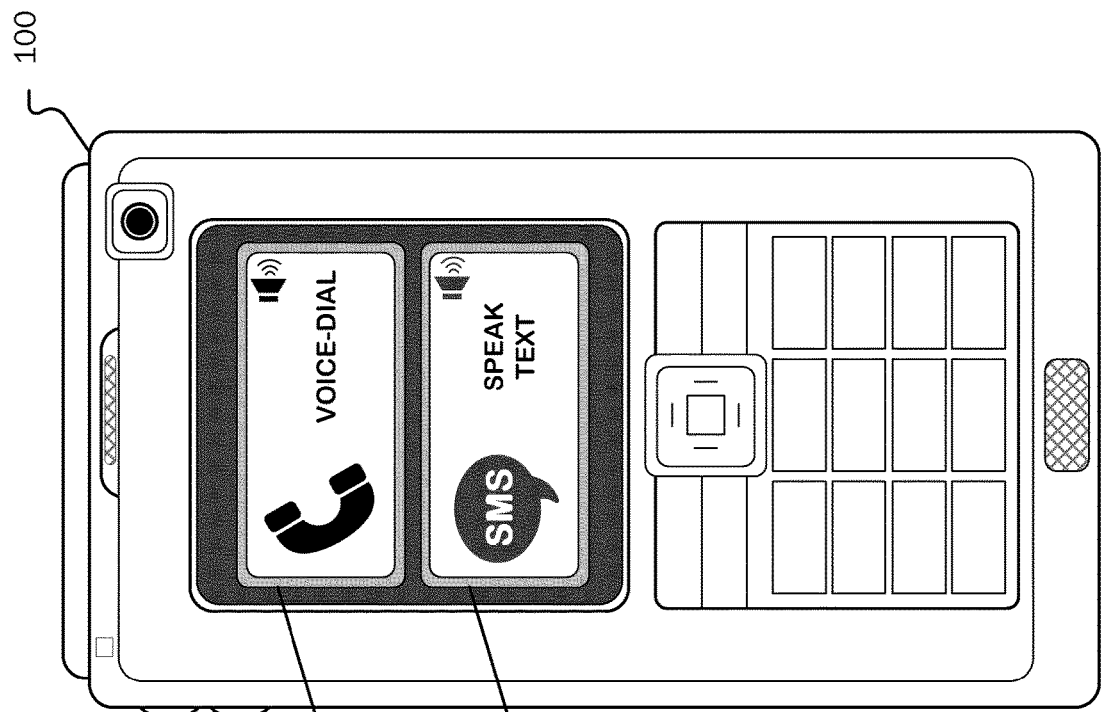
FIG. 3B is an illustration of an example mobile computing device 100 in motion UI mode.
Figure 3A:
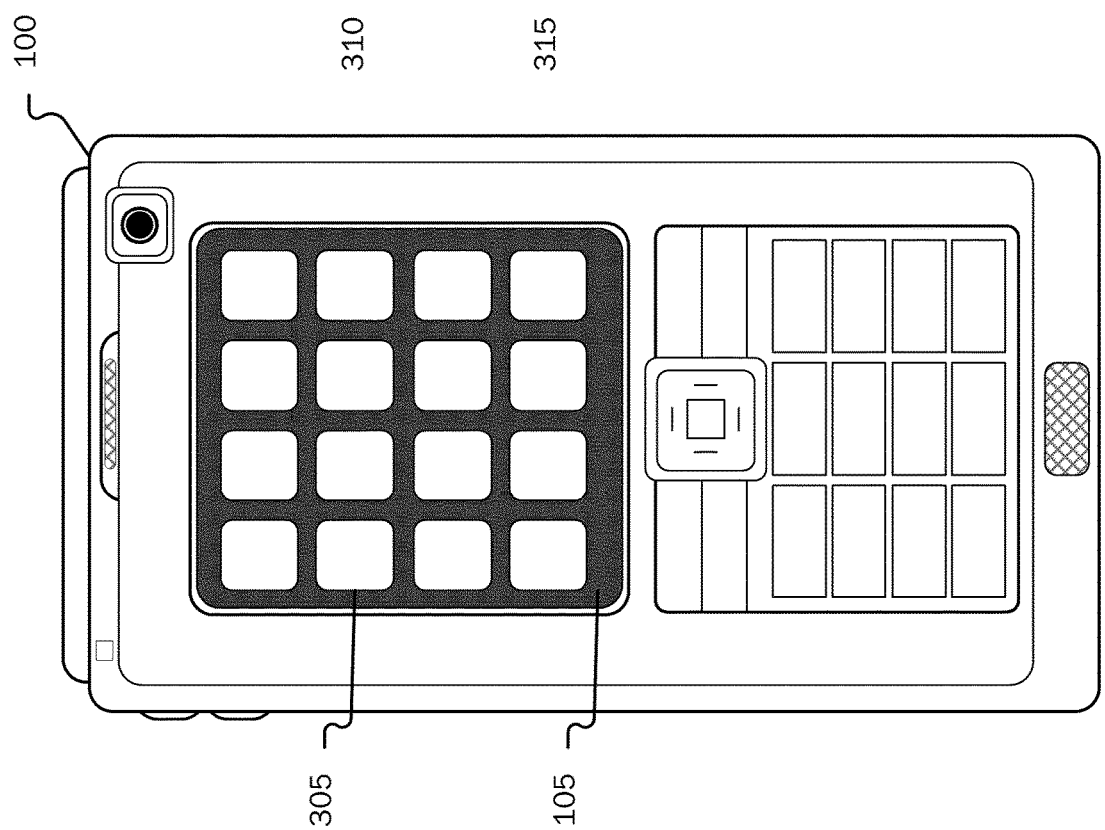
FIG. 3A is an illustration of an example mobile computing device 100 in standard UI mode.

Referring now to FIGS. 3A and 3B, an example motion mode UI is shown. FIG. 3A shows a touch screen phone 100 wherein a standard UI is applied. As can be seen on the display 105 of the example device 100, multiple selectable icons 305 may be available for a user to select and launch an application. It can be appreciated that while driving, attempting to select a small icon amongst a plurality of small icons on a display may require a user to divert his/her eyes away from the road for a longer period of time than may be deemed safe. FIG. 3B shows the same device 100 when in motion mode. Motion mode may allow for a certain functionalities to be available to a user, for example, only hands-free functionalities such as voice-dialing and speak-texting. In this example, two large, visually distinct buttons are displayed; one labeled "voice-dial" 310, and one labeled "speak text" 315. The icons and text may be in high-contrast, easy-to-read fonts. A selection between two large icons versus selection of a small icon amongst a plurality of small icons may allow for a user to be less distracted when utilizing his/her device while driving. A variety of UI characteristics and functionalities may be changed on a device 100 while in motion mode.

As opposed to a standard mode UI, where a large number of applications and functionalities may be available, a motion mode UI is a simplified UI. By limiting what functionalities are available to a user while he/she is in motion, for example, while driving, the user may be less distracted by his/her device. For example, certain functionalities may be determined as relatively safe tasks to perform while driving and may be available for utilization during motion mode. Such tasks may include, but are not limited to, making or receiving a call, hands-free tasks such as voice dialing, voice commands, using a speakerphone or Bluetooth headset, voice recognition technologies which may enable spoken speech to be converted into text messages or email messages, and the like. Certain functionalities may be determined as relatively unsafe tasks to perform while driving, and may not be available for utilization when a device 100 is in motion mode. Such tasks may include, but are not limited to, playing games, Web browsing, manual keyboard entry tasks, etc. The method 200 ends at OPERATION 230.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a user interface of a mobile phone while the mobile phone is in motion as a result of operation of a vehicle, the method comprising:
    enabling a motion mode of the mobile phone;
    while the mobile phone is in motion for a period of time as a result of the operation of the vehicle, determining if the motion mode of the mobile phone is enabled, and
    if the motion mode of the mobile phone is enabled:
        providing a user interface for controlling a selectable functionality of the mobile phone;
        detecting a motion state of the mobile phone;
        determining if the motion state of the mobile phone meets a prescribed threshold for a period of time; and
        if the motion state of the mobile phone meets the prescribed threshold for the period of time, activating the enabled motion mode of the mobile phone and, upon activating the enabled motion mode of the mobile phone, altering the user interface when displayed on the mobile phone by simplifying one or more characteristics of the user interface for controlling the selectable functionality of the mobile phone;
        after simplifying the one or more characteristics of the user interface for controlling the selectable functionality, receiving user input by interfacing with the simplified one or more characteristics displayed on the mobile phone for controlling the selectable functionality;
        continuing use of the mobile phone by using the selectable functionality associated with the one or more of the simplified characteristics of the user interface so long as the mobile phone meets the prescribed threshold; and
        upon determining the mobile phone no longer meets the prescribed threshold, displaying the one or more characteristics of the user interface for controlling the selectable functionality of the mobile phone as unaltered; and
    if the motion mode of the mobile phone is not enabled, providing the user interface as unaltered for controlling the selectable functionality of the mobile phone regardless of whether the prescribed threshold is met.

2. The method of claim 1, wherein determining if the motion state of the mobile phone meets the prescribed threshold includes safeguarding against a false motion state detection.

3. The method of claim 2, wherein detecting the motion state of the mobile phone and determining if the motion state of the mobile phone meets the prescribed threshold comprises deriving speed information for the mobile phone from a location determining system.

4. The method of claim 3, wherein determining if the motion state of the mobile phone meets the prescribed threshold includes determining whether the mobile phone is moving at or above a prescribed speed.

5. The method of claim 2, wherein detecting the motion state of the mobile phone and determining if the motion state of the mobile phone meets the prescribed threshold comprises deriving acceleration information from an accelerometer.

6. The method of claim 1, wherein detecting the motion state of the mobile phone and determining if the motion state of the mobile phone meets the prescribed threshold comprises deriving acceleration information from a network-based location determining system.

7. The method of claim 6, wherein determining if the motion state of the mobile phone meets the prescribed threshold includes determining whether the mobile phone is moving at or above a prescribed speed.

8. The method of claim 1, wherein altering the user interface if the motion state of the mobile phone meets the prescribed threshold includes changing at least one of font typography, font size, colors used, overall screen layout, screen brightness, iconography, icon sizing, onscreen visual elements, onscreen control elements, ringer settings, notification settings, manual button functionalities, availability of various phone applications, availability of various phone features, availability of various settings, voice command and control functionalities, or audible feedback.

9. The method of claim 1, further comprising preventing an altering of at least one characteristic of the user interface while the motion state of the mobile phone meets the prescribed threshold.

10. A system for providing a user interface of a mobile phone in a vehicle, the system comprising:
    a user interface for controlling a selectable functionality of the mobile phone;
    a motion detection system operative to determine if a motion mode of the mobile phone has been enabled, and if the motion mode of the mobile phone has been enabled, detect a motion state of the mobile phone and determine if the motion state of the mobile phone meets a prescribed threshold for a period of time; and
    an application operative, when the motion mode is enabled, to alter the user interface displayed on the mobile phone while the motion state of the mobile phone meets the prescribed threshold, including simplifying one or more characteristics of the user interface displayed on the mobile phone for controlling the selectable functionality to enhance use of the selectable functionality when the motion state of the mobile phone meets the prescribed threshold, wherein after the one or more characteristics of the user interface are simplified for controlling the selectable functionality, user input is received by interfacing with the simplified one or more characteristics of the user interface displayed on the mobile phone and use of the mobile phone is continued by using the selectable functionality associated with the simplified one or more characteristics of the user interface so long as the mobile phone meets the prescribed threshold; and upon determining the mobile phone no longer meets the prescribed threshold, displaying the one or more characteristics for controlling the selectable functionality of the mobile phone as unaltered, the application further operative, when the motion mode is not enabled, to display on the mobile phone the user interface as unaltered for controlling the selectable functionality of the mobile phone regardless of motion of the mobile phone.

11. The system of claim 10, the system further operative to safeguard against a false motion state detection.

12. The system of claim 11, wherein the system operative to detect a motion of the mobile phone and to determine if the motion state of the mobile phone meets the prescribed threshold is a location determining system.

13. The system of claim 12, wherein the prescribed threshold comprises a speed threshold.

14. The system of claim 11, wherein the system operative to detect a motion of the mobile phone and to determine if the motion state of the mobile phone meets the prescribed threshold is an accelerometer.

15. The system of claim 14, wherein the prescribed threshold includes an acceleration threshold.

16. The system of claim 10, wherein the application is further operative to alter one or more functionalities of the mobile phone including altering at least one of font typography, font size, colors used, overall screen layout, screen brightness, iconography, icon sizing, onscreen visual elements, onscreen control elements, ringer settings, notification settings, manual button functionalities, availability of various phone applications, availability of various phone features, availability of various settings, voice command and control functionalities, or audible feedback.

17. A computer readable storage device containing computer executable instructions which when executed by a computer perform a method for providing a user interface of a mobile phone while the mobile phone is in motion, the method comprising:
  enabling a motion mode of the mobile phone;
  determining if the motion mode of the mobile phone has been enabled, and if the motion mode of the mobile phone has been enabled:
    providing a user interface for controlling a selectable functionality of the mobile phone;
    detecting a motion state of the mobile phone;
    determining if the motion state of the mobile phone meets a prescribed threshold for a period of time; and
    when the motion state of the mobile phone meets a prescribed threshold for a period of time, activating the enabled motion mode of the mobile phone and, upon activating the enabled motion mode of the mobile phone, altering the user interface when displayed on the mobile phone by simplifying one or more characteristics of the user interface for controlling the selectable functionality of the mobile phone;
    after simplifying the one or more characteristics of the user interface for controlling the selectable functionality, receiving user input by interfacing with the simplified one or more characteristics displayed on the mobile phone for controlling the selectable functionality;
    continuing use of the mobile phone by using the selectable functionality associated with the one or more of the simplified characteristics of the user interface so long as the mobile phone meets the prescribed threshold; and
    upon determining the mobile phone no longer meets the prescribed threshold, displaying the one or more characteristics for controlling the selectable functionality of the mobile phone as unaltered; and
  if the motion mode of the mobile phone is not enabled and while the vehicle remains in motion, providing the user interface as unaltered for controlling the selectable functionality of the mobile phone regardless of motion of whether the prescribed threshold is met.

18. The computer readable storage device of claim 17, wherein detecting the motion state of the mobile phone and determining if the motion state of the mobile phone meets the prescribed threshold comprises deriving motion information from a location determining system.

19. The computer readable storage device of claim 17, wherein altering the user interface if the motion state of the mobile phone meets the prescribed threshold includes changing at least one of font typography, font size, colors used, overall screen layout, screen brightness, iconography, icon sizing, onscreen visual elements, onscreen control elements, ringer settings, notification settings, manual button functionalities, availability of various phone applications, availability of various phone features, availability of various settings, voice command and control functionalities, or audible feedback.

20. The computer readable storage device of claim 17, wherein altering the user interface if the motion state of the mobile phone meets the prescribed threshold includes changing a touch screen to simplified larger, easier-to-hit on-screen icon targets.

21. The computer readable storage device of claim 20, wherein the larger, easier-to-hit on-screen icons are modified to reduce the need for driver concentration to select the selectable functionalities.

* * * * *